US012065879B2

(12) United States Patent
Cook et al.

(10) Patent No.: US 12,065,879 B2
(45) Date of Patent: Aug. 20, 2024

(54) BRACES FOR LADDERS, LADDERS INCORPORATING SAME AND RELATED METHODS

(71) Applicant: LITTLE GIANT LADDER SYSTEMS, LLC, Springville, UT (US)

(72) Inventors: Benjamin L. Cook, Provo, UT (US); N. Ryan Moss, Mapleton, UT (US); Brian B. Russell, Saratoga Springs, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 875 days.

(21) Appl. No.: 17/072,884

(22) Filed: Oct. 16, 2020

(65) Prior Publication Data

US 2021/0032932 A1 Feb. 4, 2021

Related U.S. Application Data

(62) Division of application No. 15/952,437, filed on Apr. 13, 2018, now Pat. No. 10,808,459.

(Continued)

(51) Int. Cl.

*E06C 7/10* (2006.01)
*E06C 1/06* (2006.01)

(Continued)

(52) U.S. Cl.

CPC .................. *E06C 7/10* (2013.01); *E06C 1/06* (2013.01); *E06C 1/16* (2013.01); *E06C 1/18* (2013.01);

(Continued)

(58) Field of Classification Search

CPC ..... E06C 7/10; E06C 1/06; E06C 1/16; E06C 1/18; E06C 1/393; E06C 7/08;

(Continued)

(56) References Cited

U.S. PATENT DOCUMENTS 475,164 A 5/1892 Sprague
877,867 A 1/1908 Rupe et al.

(Continued)

FOREIGN PATENT DOCUMENTS

CN 104594794 A 5/2015
CN 106285450 A 1/2017

(Continued)

OTHER PUBLICATIONS

FR-2714931-A1 translation (Year: 1995).*

(Continued)

*Primary Examiner* — Kyle J. Walraed-Sullivan
*Assistant Examiner* — Jacob G Sweeney
(74) *Attorney, Agent, or Firm* — Dorsey & Whitney LLP

(57) ABSTRACT

Ladder components, such as braces, as well as ladders and methods of manufacturing ladders are provided. In one embodiment, a ladder brace is provided which extends between a rail and a cross member (e.g., a rung or a cross-brace). The ladder brace may include a first connecting portion associated with the rail, a second connecting portion associated with the cross member, and a strut portion extending between the first and second connecting portions. At least one of the first connecting portion and the second connecting portion is configured to completely encircle its associated component (e.g., either the rail or the cross member, respectively).

20 Claims, 9 Drawing Sheets

Related U.S. Application Data

(60) Provisional application No. 62/485,172, filed on Apr. 13, 2017.

(51) Int. Cl.

| | |
|---|---|
| ***E06C 1/16*** | (2006.01) |
| ***E06C 1/18*** | (2006.01) |
| ***E06C 1/393*** | (2006.01) |
| ***E06C 7/08*** | (2006.01) |
| ***E06C 7/42*** | (2006.01) |
| ***E06C 7/46*** | (2006.01) |
| ***E06C 7/50*** | (2006.01) |

(52) U.S. Cl.
CPC ................ *E06C 1/393* (2013.01); *E06C 7/08* (2013.01); *E06C 7/081* (2013.01); *E06C 7/083* (2013.01); *E06C 7/46* (2013.01); *E06C 7/50* (2013.01); *E06C 7/42* (2013.01)

(58) Field of Classification Search
CPC . E06C 7/081; E06C 7/083; E06C 7/46; E06C 7/50; E06C 7/42
See application file for complete search history.

(56) References Cited

U.S. PATENT DOCUMENTS

| | | | | | |
|---|---|---|---|---|---|
| 1,838,796 | A | | 12/1931 | Tingleaf | |
| 2,018,787 | A | | 10/1935 | Howard | |
| 2,633,283 | A | * | 3/1953 | Derby | E06C 7/44 182/200 |
| 2,665,950 | A | | 1/1954 | Johnson | |
| 2,919,762 | A | | 1/1960 | Alford et al. | |
| 2,960,182 | A | | 11/1960 | Swanson | |
| 3,005,513 | A | | 10/1961 | Larson | |
| 3,012,628 | A | | 12/1961 | William | |
| 3,086,612 | A | | 4/1963 | Mckinley | |
| 3,739,876 | A | | 6/1973 | Goldberg | |
| 4,043,423 | A | | 8/1977 | Elias et al. | |
| 4,989,692 | A | | 2/1991 | Min | |
| 5,158,151 | A | | 10/1992 | Chang | |
| 5,636,706 | A | | 6/1997 | Plotner et al. | |
| 9,410,375 | B1 | | 8/2016 | Howe et al. | |
| 10,808,459 | B2 | | 10/2020 | Cook et al. | |
| 2003/0079941 | A1 | | 5/2003 | Pettit | |
| 2003/0221910 | A1 | | 12/2003 | Huang | |
| 2005/0173194 | A1 | | 8/2005 | Pate et al. | |
| 2005/0274571 | A1 | | 12/2005 | Simpson et al. | |
| 2006/0060423 | A1 | * | 3/2006 | Astor | E06C 7/10 182/220 |
| 2008/0023268 | A1 | | 1/2008 | Kelly et al. | |
| 2012/0090920 | A1 | | 4/2012 | Gross et al. | |
| 2012/0217093 | A1 | | 8/2012 | Latimer et al. | |
| 2013/0292525 | A1 | | 11/2013 | Worthington | |
| 2016/0023095 | A1 | | 1/2016 | Nally | |
| 2018/0171714 | A1 | | 6/2018 | Dings | |
| 2018/0298691 | A1 | | 10/2018 | Cook et al. | |

FOREIGN PATENT DOCUMENTS

| | | | | | |
|---|---|---|---|---|---|
| DE | 202015007608 | U1 | | 1/2016 | |
| DE | 202016104013 | U1 | | 10/2016 | |
| FR | 2714931 | A1 | * | 7/1995 | E04G 7/16 |
| FR | 3066223 | A1 | | 11/2018 | |
| JP | 2002213170 | A | | 7/2002 | |
| KR | 200146389 | Y1 | | 6/1999 | |
| WO | 2018191623 | A1 | | 10/2018 | |

OTHER PUBLICATIONS

American Heritage Dictionary of the English Language, Fifth Edition. Copyright 2016 by Houghton Mifflin Harcourt Publishing Company. Published by Houghton Mifflin Harcourt Publishing Company. All rights reserved. (Year: 2019).

International Search Report and Written Opinion dated Jul. 6, 2018 for PCT Application No. PCT/US2018/027497, 10 pages.

* cited by examiner

BRACES FOR LADDERS, LADDERS INCORPORATING SAME AND RELATED METHODS

CROSS-REFERENCE TO RELATED APPLICATIONS

This application is a divisional of U.S. patent application Ser. No. 15/952,437, filed on 13 Apr. 2018, now patented as U.S. Pat. No. 10,808,459, issued on 20 Oct. 2020, which claims the benefit of U.S. Provisional Patent Application No. 62/485,172, filed on 13 Apr. 2017, the disclosures of which are incorporated by reference herein in their entireties.

BACKGROUND

Ladders are conventionally utilized to provide a user thereof with improved access to elevated locations that might otherwise be inaccessible. Ladders come in many shapes and sizes, such as straight ladders, straight extension ladders, stepladders, and combination step and extension ladders. So-called combination ladders may incorporate, in a single ladder, many of the benefits of multiple ladder designs.

Ladders such as stepladders and step stools are highly utilized by various tradesman as well as homeowners. Such ladders are "self-supporting" in that they do not require the upper end of the ladder to be positioned against a supporting structure, such as against a wall or the edge of a roof. Rather, stepladders (including step stools) include multiple feet (typically either three or four) that are spaced from one another to provide a stable base or foundational structure to support the ladder and a user when placed on, for example, a floor or the ground. This enables a user of the ladder to gain access to elevated areas even though the accessed area may be, for example, in the middle of a room, away from walls or other potential supporting structures that are conventionally required when using a straight ladder or an extension ladder.

For these reasons and others, ladders configured as stepladders or step stools are popular configurations that comprise a large segment of the ladder market. However, there are always areas of potential improvement. For example, it is a continual desire to provide ladders that meet, and even exceed, existing standards for strength and safety. At the same time, it is desirable to enable more efficient production and improved manufacturing techniques relating to the fabrication of ladders.

SUMMARY OF THE DISCLOSURE

The present disclosure provides ladders, ladder components and methods of manufacturing ladders. In accordance with one embodiment, a ladder is provided that comprises a first rail, a second rail spaced apart from the first rail, and at least one member extending between and coupled to the first rail and the second rail. The ladder further includes at least one brace, wherein the brace includes a first connecting portion coupled with the first rail, a second connecting portion coupled with the at least one member, and a strut portion extending between, and connected to, the first connecting portion and the second connecting portion, wherein the first connecting portion includes a tubular configuration that encircles a portion of the first rail.

In one embodiment, the second connecting portion includes a tubular configuration that encircles a portion of the at least one member.

In one embodiment, the at least one member includes a ladder rung.

In one embodiment, the at least one member includes a cross-member.

In one embodiment, the at least brace is formed as a unitary member.

In one embodiment, the second connecting portion includes at least one flange, wherein the at least one flange is coupled with the at least one member.

In one embodiment, the ladder further comprises a mechanical fastener coupling the at least one flange with the at least one member.

In one embodiment, the first connecting portion is not fastened to the first rail by mechanical fastener or by adhesive.

In one embodiment, the first connecting portion maintains a sliding relationship with first rail.

In one embodiment, the tubular portion conformally engages the exterior surface of the first rail.

In one embodiment, the first rail exhibits a C-shaped cross-sectional profile having a web member and two flange members, and wherein the first connecting portion includes an abutting projection that extends into contact with the web member.

In accordance with another embodiment of the present disclosure, a method is provided that includes providing a first rail, providing a cross-member, providing a first brace having a first connecting portion, a second connecting portion, and a strut portion between the first connecting portion and the second connecting portion, the first connecting portion having a tubular configuration, sliding the first rail through an opening of the tubular configuration such that the first connecting portion surrounds a portion of the first rail; and coupling the second connecting portion with the first cross-member.

In one embodiment, coupling the second connecting portion with the first cross-member includes sliding the cross-member through an opening of a tubular configuration of the second connecting portion such that the second connecting portion surrounds a portion of the cross-member.

In one embodiment, the method further comprises coupling the cross-member with the first rail after sliding the cross-member through the opening of the tubular configuration of the second connecting portion.

In one embodiment, the method further comprises coupling the cross-member to the first rail.

In one embodiment, coupling the cross-member to the first rail occurs prior to sliding the first rail through an opening of the tubular configuration.

In one embodiment, coupling the second connecting portion with the cross-member includes coupling a flange of the first connecting portion with the first cross-member using a mechanical fastener.

In one embodiment, the method further includes providing a second rail, providing a second brace having a first connecting portion, a second connecting portion, and a strut portion between the first connecting portion and the second connecting portion, the first connecting portion having a tubular configuration, sliding the second rail through an opening of the tubular configuration of the second brace such that the first connecting portion of the second brace surrounds a portion of the second rail, and coupling the second connecting portion of the second brace with the cross-member.

In one embodiment, the method further comprises leaving the first rail free to slide within the tubular configuration.

In one embodiment, the method further comprises fastening the first connecting portion with the first rail with a mechanical fastener.

Additional details and embodiments are set forth below herein. It is noted that features, components or acts of one embodiment may be combined with features, components or acts or other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
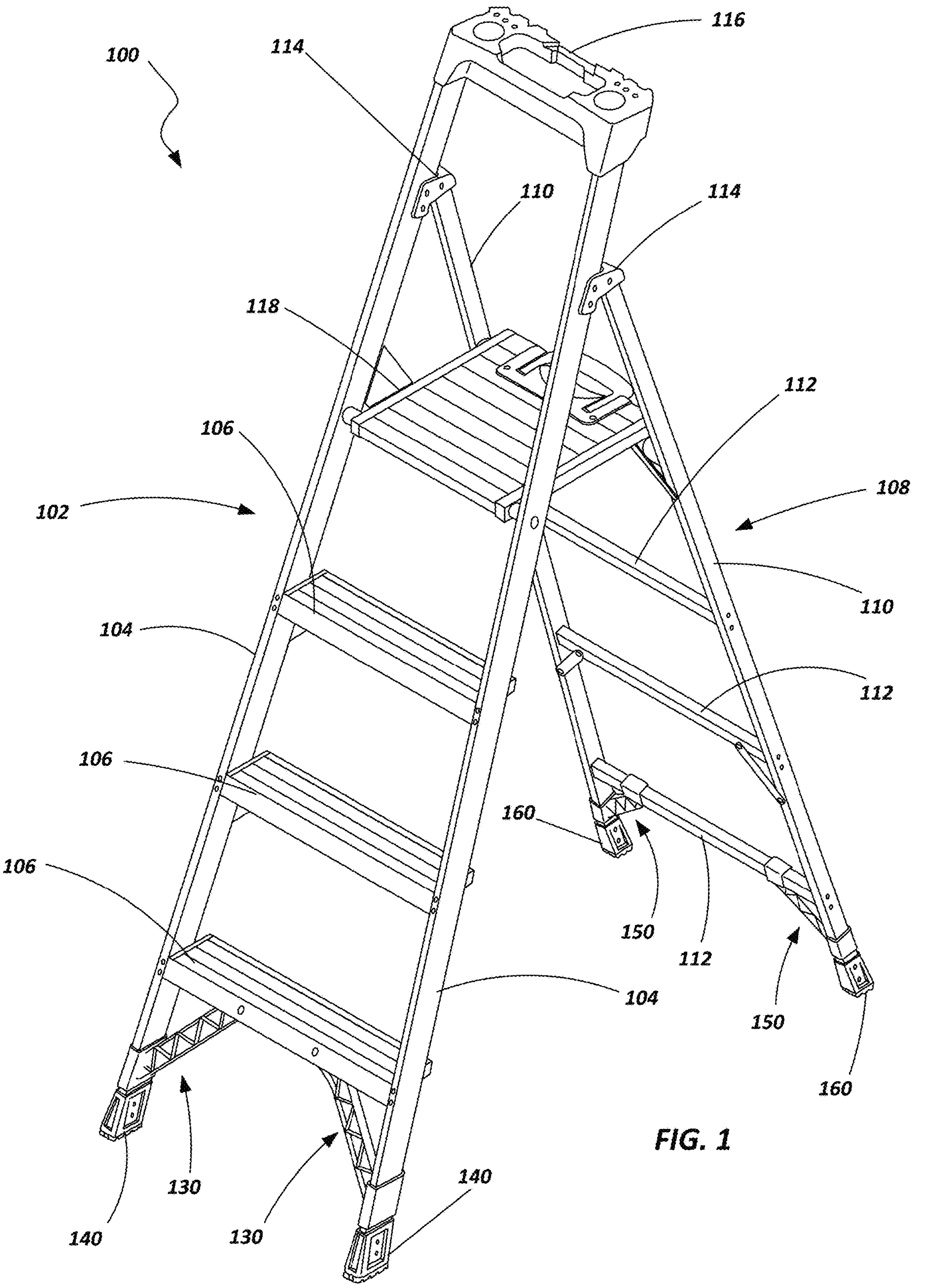
FIG. 1 is a perspective view of a stepladder according to an embodiment of the present invention.

Referring generally to FIG. 1, a ladder 100 is shown in accordance with an embodiment of the present invention. The ladder 100 shown in FIG. 1 is configured generally as a platform stepladder and includes a first assembly 102 having a pair of spaced apart rails 104 and a plurality of rungs 106 extending between, and coupled to, the rails 104 (e.g., by mechanical fastener, adhesive or material joining techniques). The rungs 106 are substantially evenly spaced, parallel to one another, and are configured to be substantially level when the ladder 100 is in an orientation for intended use, so that they may be used as "steps" to support a user as they ascend the ladder 100 and as will be appreciated by those of ordinary skill in the art.

The ladder 100 also includes a second assembly 108 having a pair of spaced apart rails 110. The second assembly 108 may also include cross-members 112 or other structural components that extend between the rails 110 to provide a desired level of structural support and strength to the spaced apart rails 110. In some embodiments, the cross-members 112 of the second assembly 108 may be configured as rungs to support a user. The second assembly 108, thus, may be used to help support the ladder 100 when in an intended operational state, such as depicted generally in FIG. 1.

In the embodiment shown in FIG. 1, hinged or pivoting connections 114 couple the first rail assembly 102 and the second rail assembly 108 together such that the two assemblies 102 and 108 may be folded or collapsed into a stored or stowed state. When in a stowed state, the first rail assembly 102 and the second rail assembly 108 are positioned adjacent each other in a relatively thin profile, such as will be appreciated by those of ordinary skill in the art.

It is noted that in the embodiment shown in FIG. 1, the rails 104 of the first assembly 102 extend substantially beyond the hinged connections 114 and are coupled with a top cap 116. In such an embodiment, the extended rails 104 and the top cap 116 may be used as a storage tray for tools, supplies or other materials. Additionally, the top cap 116 may be used as a handrail to help support or balance a user when they are standing on the ladder 100. It is noted, however, the various features and aspects of the present invention are applicable to, and contemplated as being incorporated with, other types of ladders including, for example, stepladders having a conventional top cap that is directly coupled to both of the first and second assemblies, as well as with extension ladders, straight ladders, combination ladders or other types of ladders.

In the embodiment shown in FIG. 1, a platform 118 is positioned above the rungs 106 and extends from the rails 104 of the first assembly 102 to the rails 110 of the second assembly 108. The platform 118 may be configured to support all, or at least a substantial portion, of a user's feet, thereby providing a comfortable and safe working surface to the user. In the presently described embodiment, the platform 118 is hingedly coupled to the rails 104 of the first assembly 102 and engages a cross-member 112 associated with the second assembly 108. In one embodiment, the platform 118 may simply rest on the associated cross-member 112. In another embodiment, a locking member may be used to selectively couple the platform 118 and the associated cross-member 112 in a deployed state or position.

The first and second assemblies 102 and 108 may be formed of a variety of materials and using a variety of manufacturing techniques. For example, in one embodiment, the rails 104 and 110 may be formed of a composite material, such as fiberglass, while the rungs and other structural components may be formed of aluminum or an aluminum alloy. In other embodiments, substantially all of the components of the assemblies may be formed of aluminum or an aluminum alloy. In other embodiments, the assemblies 102 and 108 (and their various components) may be formed of other materials including other composites, plastics, polymers, various metals and metal alloys.

The ladder 100 may also include various bracing and structural reinforcement members including, but not limited to, a front brace 130 located below the lowermost rung 106 of the first assembly 102, and a rear brace 150, located below the lowermost cross-member 112 of the second assembly 108.

Figure 2:
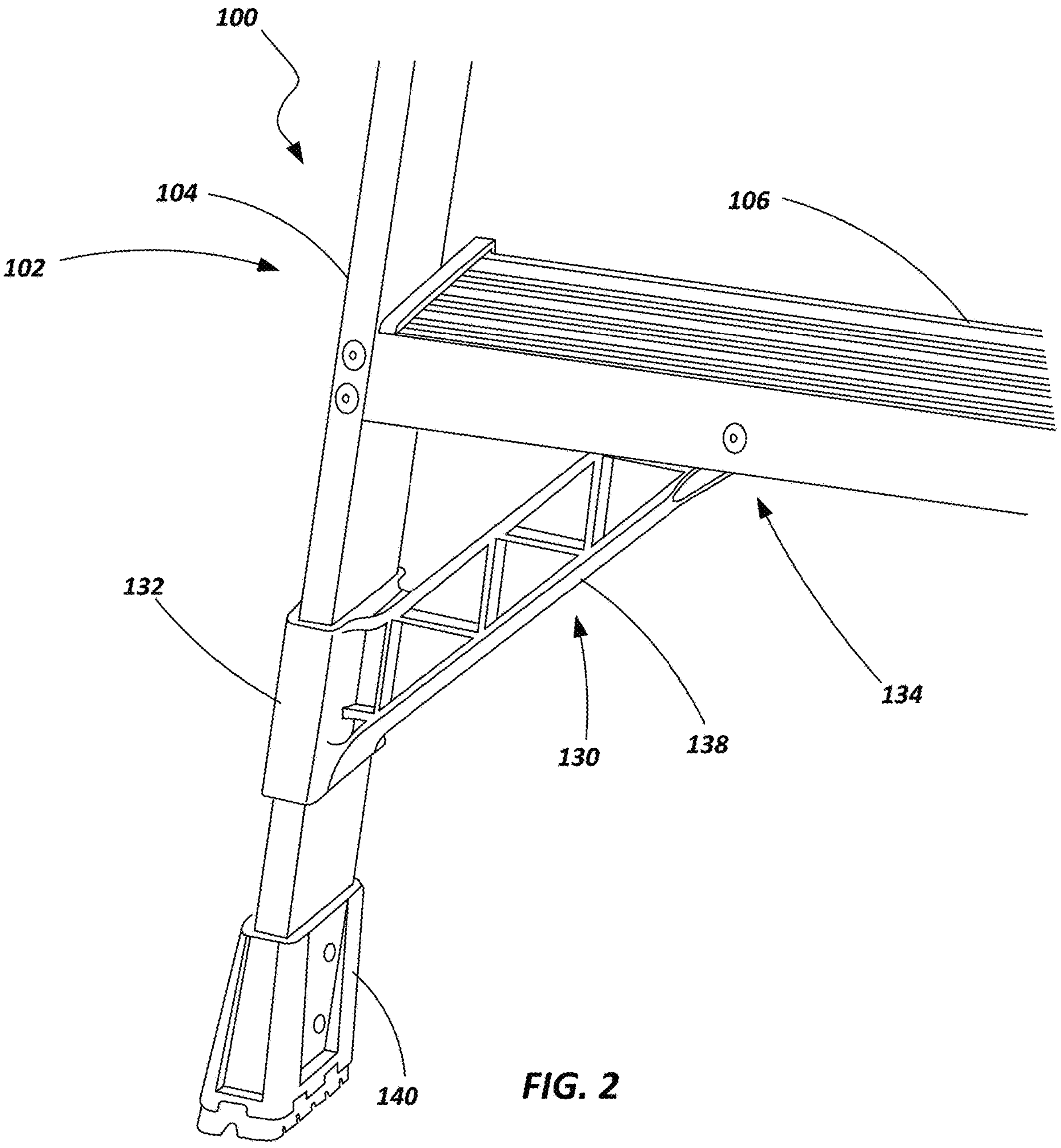
FIG. 2 is a perspective view of a portion of the stepladder shown in FIG. 1.
Figure 3:
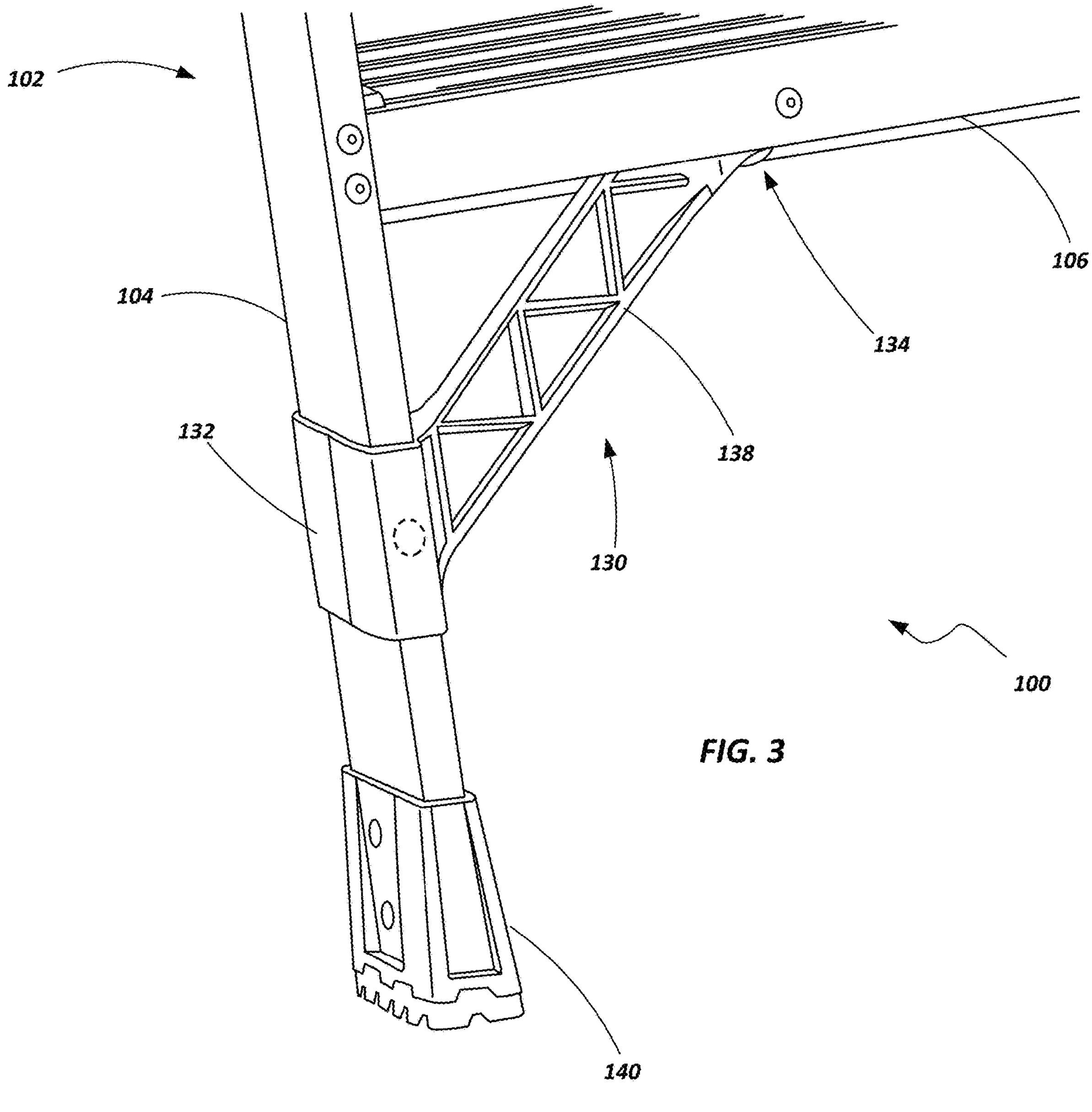
FIG. 3 is another perspective view of a portion of the stepladder shown in FIG. 1.
Figure 4:
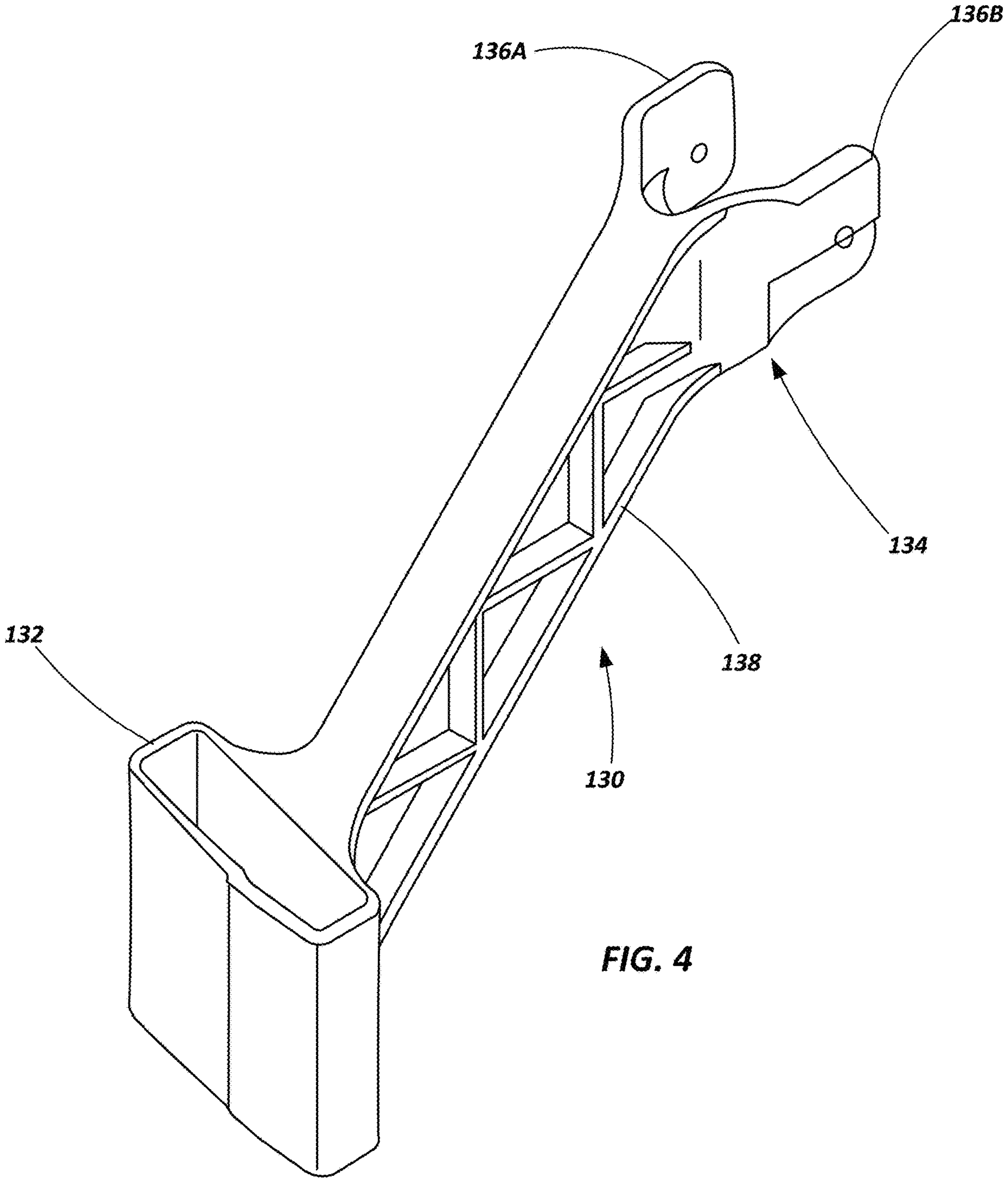
FIG. 4 is a perspective view of a brace of the stepladder shown in FIG. 1.

As seen in FIGS. 2-4, the front brace 130 includes a first connecting portion (referred herein as a rail connecting portion 132 for convenience and clarity) which connects with an associated rail 104 of the first assembly 102. The front brace 130 further includes a second connecting portion (referred to herein as a rung connecting portion 134—see FIG. 4) which connects to a rung 106 (e.g., the lowermost rung). In one example, the rung connecting portion 134 may include a pair of flanges 136A and 136B, each being configured to be coupled to a portion of the associated rung 106. The front brace 130 further includes a beam or strut member 138 extending between, and coupled with the rung connecting portion 134 and the rail connecting portion 132.

In one embodiment, the flanges 136A and 136B may be fastened to front and rear portions of the rung 106, respectively, by way of rivets, screws, bolts or other mechanical fasteners. In other embodiments, the flanges 136A and 136B may be coupled with the rung 106 by way of clips, adhesives, welding or other material joining processes.

In one embodiment, the front brace 130 may be made as unitary member. For example, the front brace 130 may be molded of a plastic material as a single unit. In other embodiments, the front brace 130 may be made from individual components that are coupled to one another by appropriate joining techniques. Additionally, in other embodiments, the front brace 130 may be made from any of a variety of other materials including metals, metal alloys and composite materials.

As may be seen in FIG. 4, in conjunction with FIGS. 2 and 3, the rail connecting portion 132 may include a generally tubular portion. Stated another way, the rail connecting portion 132 may exhibit a closed, cross-sectional geometry (e.g., a polygonal cross section) having an opening extending therethrough such that it is configured to encircle the rail 104 of the first assembly 102. In some embodiments, the opening of the tubular portion may be configured to be substantially conformal to the shape of the rail 104. Thus, in assembling the ladder 100, the rail connecting portion 132 of the front brace 130 may slide over the rail 104 until the flange members 136A and 136B are positioned at an appropriate location relative to the rung 106 for fastening therewith. In one embodiment, the rail connecting portion 132 remains unfixed to the rail 104, other than by the encircling of the rail 104 by the nature of its generally tubular configuration. In other words, in such an embodiment, the front brace 130 is not fixed to the rail 104 by way of a mechanical fastener (e.g., rivet, screw, etc.), adhesives or other material joining techniques.

It is noted that the rail 104 may be formed to exhibit any of a variety of different shapes. For example, in one embodiment, the rail 104 may be configured to exhibit a substantially rectangular cross-section (e.g., a box channel or channel tube). In another embodiment the rail 104 may be configured to exhibit a substantially c-shaped cross-section (a C-channel) or an I or H shaped cross-section. In such embodiments, the tubular portion of the rail connecting portion 132 may be configured to encircle the rail without entirely conforming to the shape of the rail (e.g., the tubular portion may be substantially rectangular while the rail is c-shaped—thus partially conforming to the shape of the rail). In other embodiments, the tubular portion may be shaped to more completely conform to the shape of the rail (e.g., the rail may be c-shaped and the opening of the tubular portion may also be c-shaped). In other embodiments, such as described below, the tubular portion may be shaped to partially conform to the shape of the rail.

The design of the front brace 130 provides a variety of advantages in the manufacture and day-to-day use of the ladder 100. For example, in fabricating the ladder 100, assembly of the front brace may be streamlined, reducing time and costs, by using a brace that slides over the rail rather than needing to be fastened by mechanical or other means. Additionally, the "wrap around" configuration of the rail connecting portion 132 provides the rail 104 of the ladder with improved impact protection. For example, the lower portions of the rails 104, such as the portions adjacent to and just above the feet 140 are exposed to scrapes and impacts as the ladder is used. This may occur when setting up the ladder, collapsing the ladder, transporting the ladder, or even when the ladder is simply in storage. Often these impacts can damage the rails. For example, if a fiberglass rail is gouged or punctured—or even significantly scraped—the strength of the rail may be compromised. Likewise, a buckling type dent in an aluminum rail may result in a ladder of compromised structural stability and safety. Thus, the wrapping of the rail by the rail connecting portion 132 may provide significant protection to the rail—whether the rail be formed of fiberglass, aluminum, or some other material.

Additionally, the design of the brace assists in providing the strength and resiliency that may be required under certain standards for a given ladder type. For example, under certain standards, ladders are required to pass what is known as a cantilever test wherein the ladder, or a portion of the ladder (e.g., one of the assemblies 102 or 108) is required to sustain a defined cantilever loading, and experience defined deflection while under the loading, but not experience permanent deformation in the components (e.g., the rails) beyond a specified amount once the load has been removed. The design of the brace, including the wrap-around connecting portions, enables the satisfaction of such types of testing requirements, even when the wrap-around connections are not mechanically fastened to the rails (i.e., the rails may slide within the wrap-around connecting portion, or move a limited amount relative to the brace, during applied loadings to the ladder, but return to their original position after loadings are removed).

It is noted that, while the rail connecting portion 132 is not shown as being mechanically fastened to the rail 104 in FIGS. 1-3, and indeed some embodiments such as described above specifically exclude such mechanical fastening, in some other embodiments it may be desirable to provide a fastener (e.g., a rivet or screw) to mechanically couple the brace 130 with the rail 104, as illustrated, for example, in broken lines in FIG. 3. In such a case, the configuration of the brace still provides substantial impact protection to the rails of the ladder 100 and advantages of assembly and manufacturing efficiency.

Figure 5:
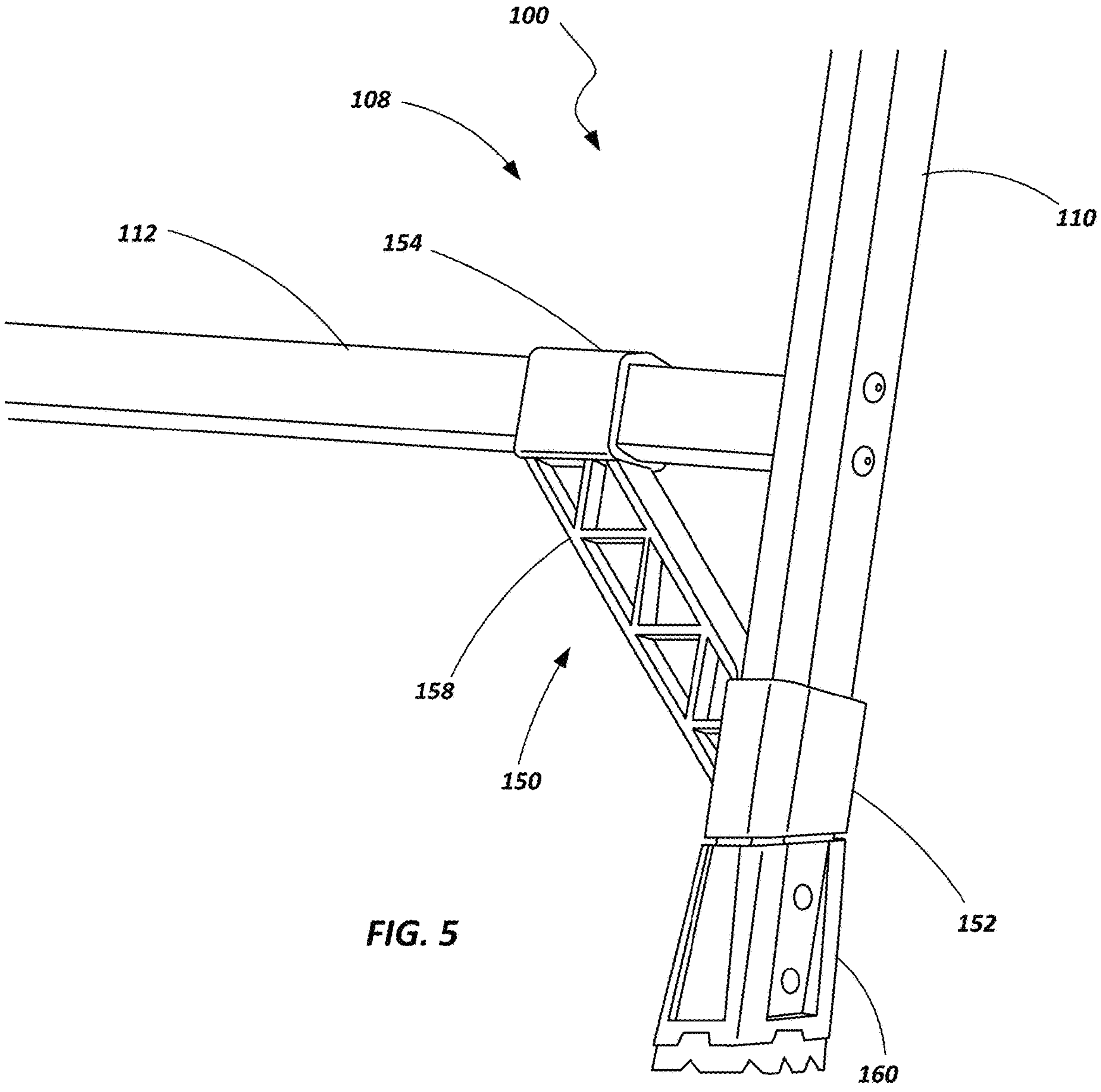
FIG. 5 is a perspective view of a portion of the stepladder shown in FIG. 1.
Figure 6:
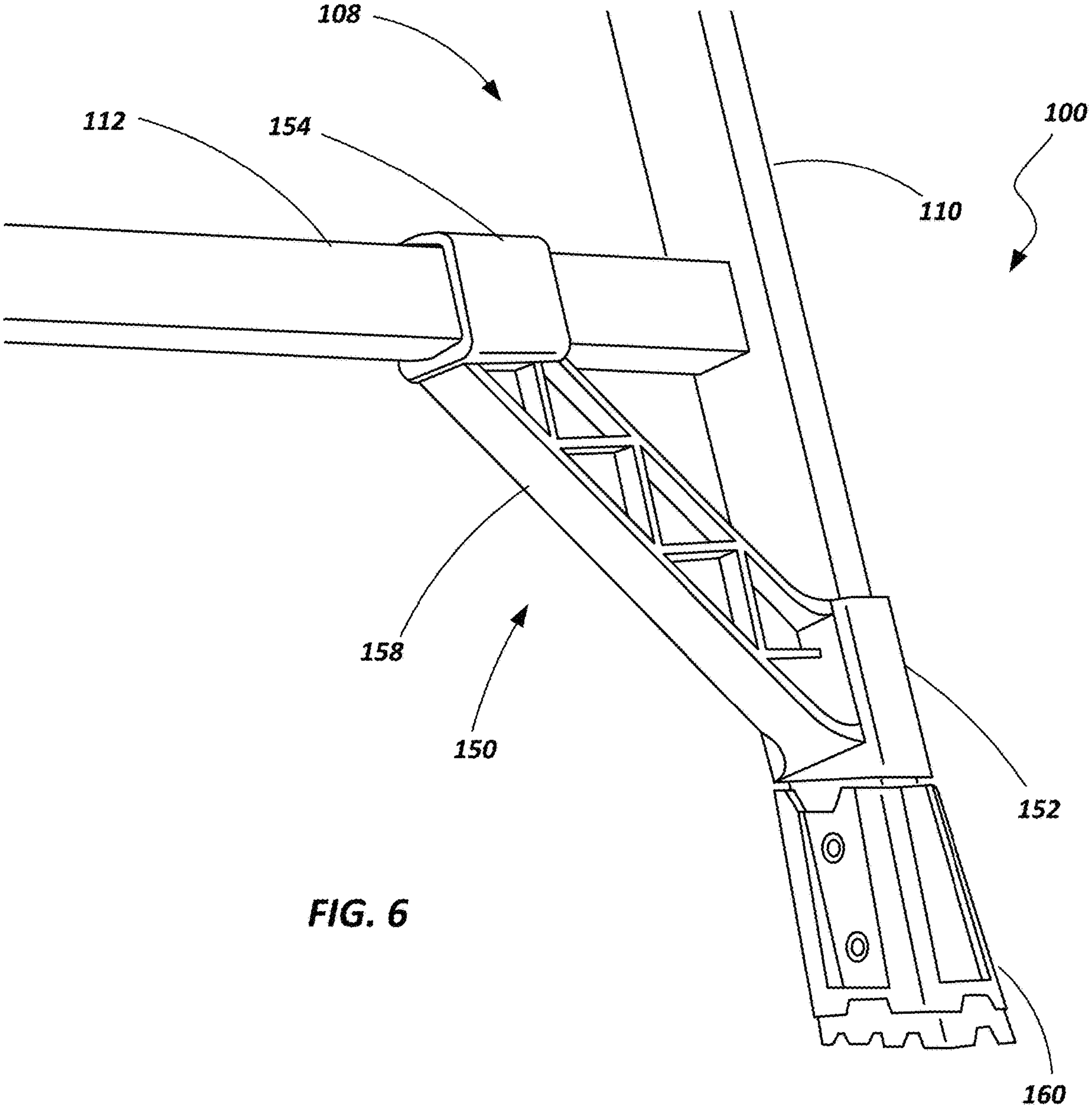
FIG. 6 is another perspective view of a portion of the stepladder shown in FIG. 1.
Figure 7:
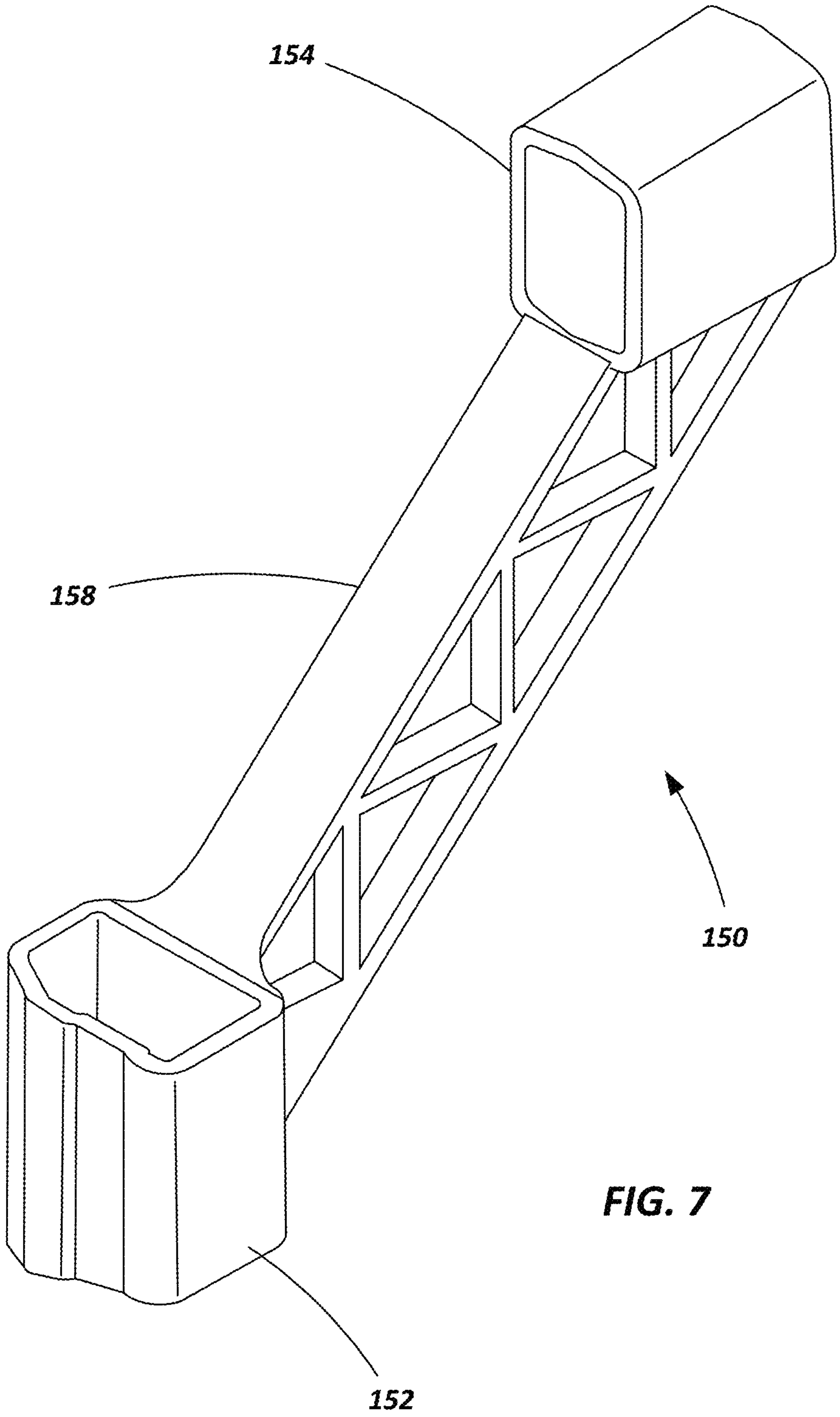
FIG. 7 is a perspective view of another brace of the stepladder shown in FIG. 1.

Referring now to FIGS. 5-7, the rear brace 150 includes a first connecting portion (referred to herein as a rail connecting portion 152) which connects with an associated rail 110 of the second assembly 108. The rear brace 150 further includes a second connecting portion (referred to herein as a cross-member connecting portion 154) which connects with a cross-member 112 (e.g., the lowermost cross-member). The rear brace 150 further includes a beam or strut member 158 extending between, and coupled with the cross-member connecting portion 154 and the rail connecting portion 152.

In one embodiment, the rear brace 150 may be made as unitary member. For example, the front brace 150 may be molded of a plastic material as a single unit. In other embodiments, the rear brace 150 may be made from individual components that are coupled to one another by appropriate joining techniques. Additionally, in other embodiments, the rear brace 150 may be made from any of a variety of other materials including metals, metal alloys and composite materials.

Both the rail connecting portion 152 and the cross-member connecting portion 154 of the rear brace 150 may include generally tubular portions. Stated another way, the rail connecting portion 152 may exhibit a closed, cross-sectional geometry (e.g., a closed polygonal cross section) having an opening extending therethrough such that it is configured to conformally encircle the rail 110 of the second assembly 108. Likewise, the cross-member connecting portion 154 may exhibit a closed cross-sectional geometry having an opening extending therethrough such that it is configured to conformally encircle the associated cross-member 112.

Thus, in assembling the ladder 100, the rail connecting portion 152 of the rear brace 150 may slide over its associated rail 110, the cross-member connection portion 154 of the rear brace 150 may slide over its associated cross-member 112 and the cross-member 112 may be coupled with the rail 110, such as by way of mechanical fasteners, adhesives, and/or other material joining techniques. In one embodiment, the rail connecting portion 152 remains unfixed to the rail 110 other than by the encircling of the rail 104 by the nature of its generally tubular configuration. Additionally, in one embodiment, the cross-member connecting portion 154 remains unfixed to the cross-member 112, other than by the encircling of the cross-member 112 by the nature of its generally tubular configuration. In other words, in such an embodiment, the rear brace 130 is neither fixed to the rail 110 nor the cross-member 112 by way of a mechanical fastener (e.g., rivet, screw, bolt, etc.), adhesives, or other material joining techniques.

It is noted that, as with the shape of the rail and corresponding rail connecting portion, the cross-member may exhibit any of a variety of different shapes and, likewise, the cross-member connecting portion may also exhibit any of a variety of different shapes, including partially conforming or completely conforming to the cross-sectional shape of the cross-member.

As with the front brace 130, the design of the rear brace 150 provides a variety of advantages in the manufacture and day-to-day use of the ladder 100 including simpler and more efficient assembly as well as providing impact and abrasion protection for portions of the rails and/or cross-member. For example, as previously noted with regard to the front brace 130, the lower portions of the rails 110, such as the portions adjacent to and just above the feet 160 (which portions are particularly vulnerable to inadvertent impacts), are provided added protection from the rear brace.

It is noted that, while the rail connecting portion 152 and the cross-member connection portion 154 are not shown as being mechanically fastened to their respective components (i.e., rail 110 and cross-member 112) in FIGS. 1, 5 and 6, and indeed in certain embodiments such mechanical fastening is expressly excluded as described above, in other embodiments it may be desirable to provide a fastener (e.g., a rivet or screw) to mechanically couple the brace 150 with the rail 110, the cross-member 112, or both. In such a case, the configuration of the brace still provides substantial impact protection to certain components of the ladder 100 as well as manufacturing and assembly efficiencies.

In various embodiments described herein, the rail connecting portions of the braces (130 and 150) are configured as tubular components with a through opening extending therethrough so that rails (e.g. 104 and 110) may slide therethrough. In other embodiments, the rail connecting portions may incorporate the feet members (e.g., 140 and 160), being configured with a blind opening such that the rail connection portions are slid over the lowermost ends of the rail (104 and 110) and act as both a connecting structure for the brace as well as a foot for the ladder rail. In such embodiments, the connecting portion may again be free from mechanical fastening with its associated rail in certain embodiments. In other embodiments, it may be desirable to utilize a mechanical fastener in addition to the conformal fitting of the rail connecting portion. Additionally, embodiments where the foot and rail connecting portion are merged into a single unitary member, the rail connecting portion may extend up the rail substantially beyond the distance of a normal foot member. In other words, the unification of the two components does not need to reduce the amount of area of the rail that is being protected from inadvertent impacts by the brace.

Figure 8:
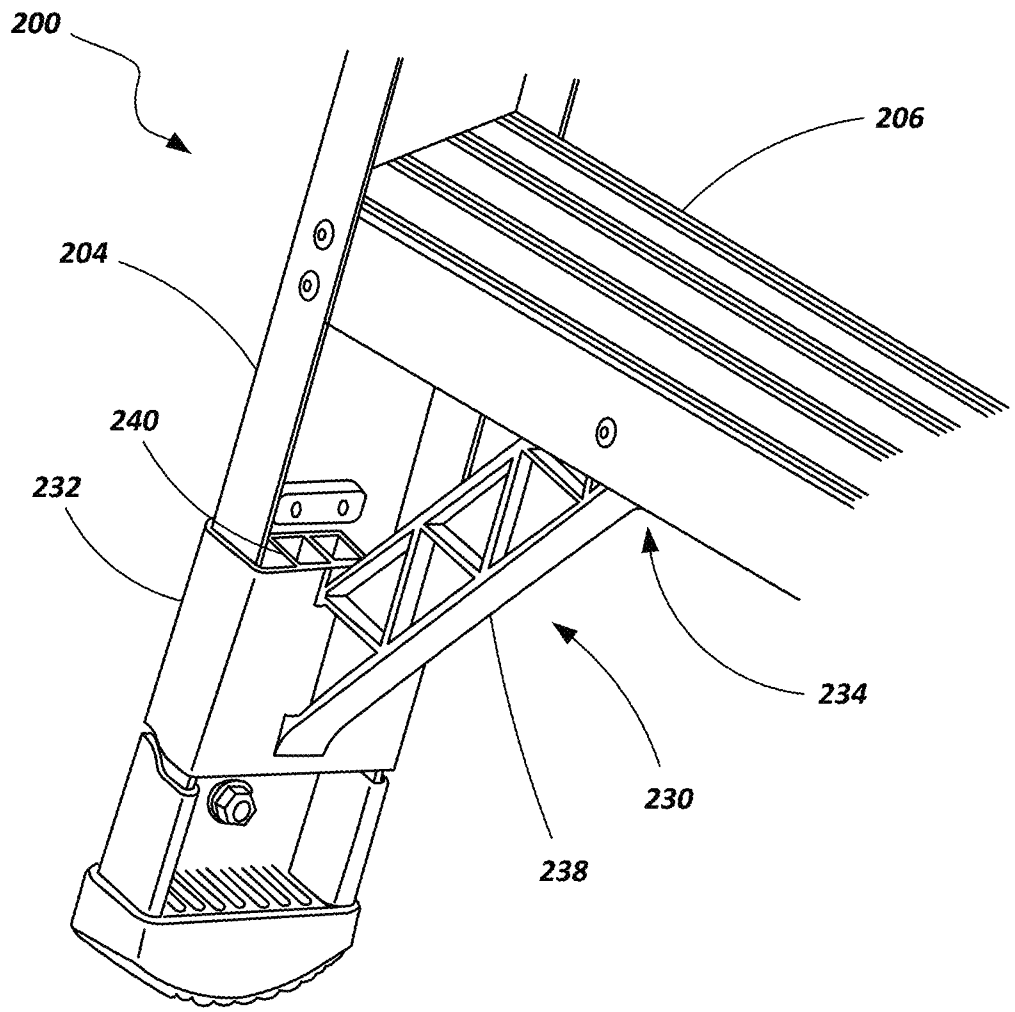
FIG. 8 is front-top perspective view of a portion of a ladder including a brace according to another embodiment of the present disclosure.
Figure 9:
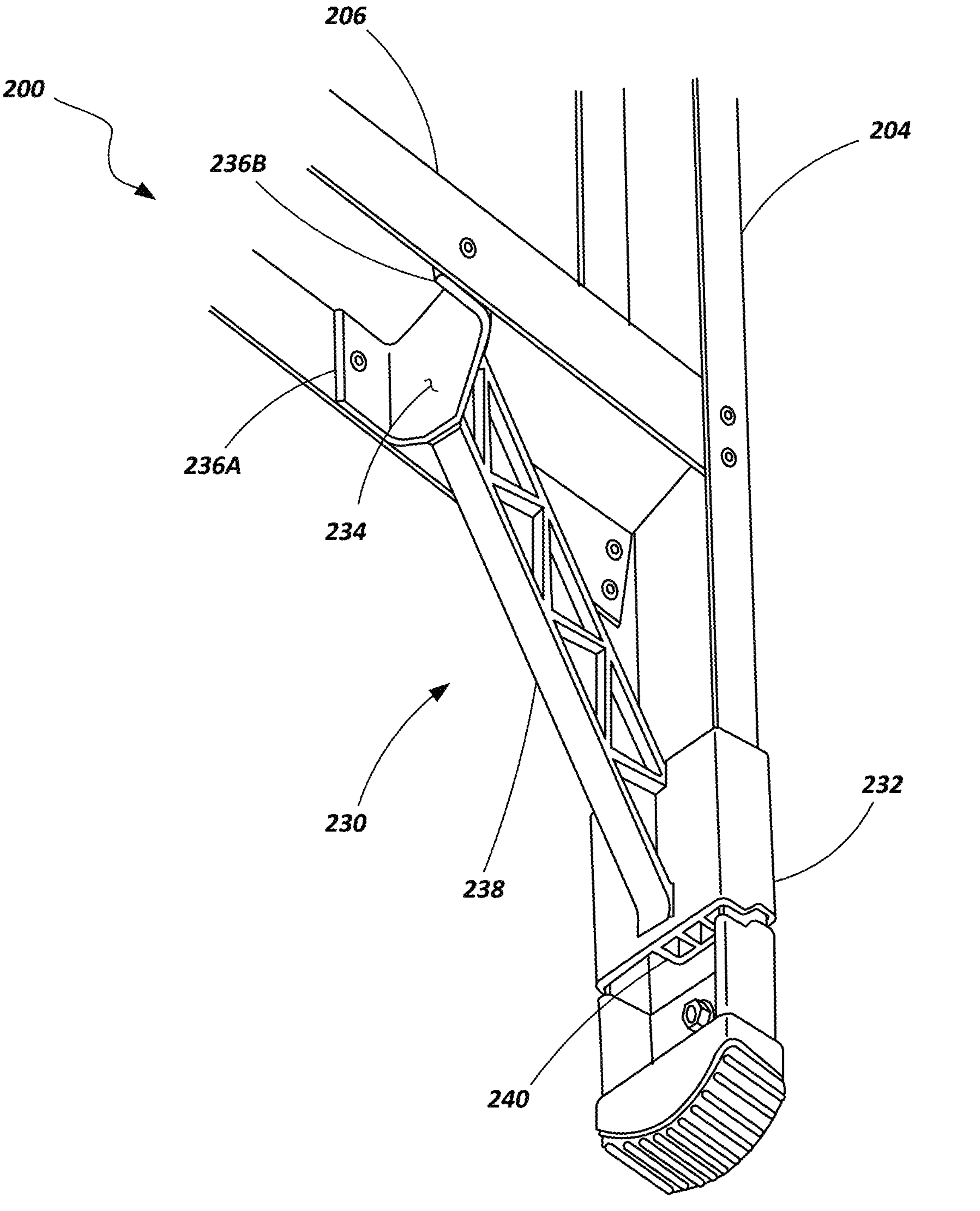
FIG. 9 is a rear-bottom perspective view of the ladder portion and brace shown in FIG. 8.

Referring now to FIGS. 8 and 9, a portion of a ladder 200 including a rail 204 and a rung 206 coupled to the rail 204. The rung 206 and rail 204 may be a portion of any type of ladder including, for example, a step ladder, platform step ladder, extension ladder, straight ladder, or combination ladder. A brace 230 extends between the rung 206 and the rail 204 such as has been described with respect to other embodiments set forth herein. The brace 230 includes a first connecting portion (referred herein as a rail connecting portion 232 for convenience and clarity) which connects with its associated rail 204. The brace 230 further includes a second connecting portion (referred to herein as a rung connecting portion 234) which connects to the rung 206. In one example, the rung connecting portion 234 may include a pair of flanges 236A and 236B, each being configured to be coupled to a portion of the associated rung 206. The brace 230 further includes a beam or strut member 238 extending between, and coupled with the rung connecting portion 234 and the rail connecting portion 232.

In one embodiment, the flanges 236A and 236B may be fastened to front and rear portions of the rung 206, respectively, by way of rivets, screws, bolts or other mechanical fasteners. In other embodiments, the flanges 236A and 236B may be coupled with the rung 206 by way of clips, adhesives, welding or other material joining processes.

In one embodiment, the brace 230 may be made as unitary member. For example, the brace 230 may be molded of a plastic material as a single unit. In other embodiments, the brace 230 may be made from individual components that are coupled to one another by appropriate joining techniques. Additionally, in other embodiments, the brace 230 may be made from any of a variety of other materials including metals, metal alloys and composite materials.

As with other embodiments described herein, the rail connecting portion 232 may include a generally tubular portion. Stated another way, the rail connecting portion 232 may exhibit a closed, cross-sectional geometry (e.g., a polygonal cross section) having an opening extending therethrough such that it is configured to encircle the rail 204. In some embodiments, the opening of the tubular portion may be configured to be substantially conformal to the shape of the rail 204. Thus, in assembling the resulting ladder, the rail connecting portion 232 of the brace 230 may slide over the rail 204 until the flange members 236A and 236B are positioned at an appropriate location relative to the rung 206 for fastening therewith. In one embodiment, the rail connecting portion 232 remains unfixed to the rail 204 other than by the encircling of the rail 204 by the nature of its generally tubular configuration. In other words, in such an embodiment, the brace 230 is not fixed to the rail 204 by way of a mechanical fastener (e.g., rivet, screw, etc.), adhesives or other material joining techniques.

It is noted that in the embodiment shown in FIGS. 8 and 9, the rail 204 is formed to exhibit a cross-sectional profile of a C-channel (e.g., a web member with a flange member on each side of the web member). The tubular configuration of the rail connecting portion 232 is configured to be at least partially conformal with the C-shape profile of the rail 204. For example, the rail connecting portion 232 includes a projecting abutment 240 which extends inwardly toward and abuts the web portion of the C-shaped rail 204. The contact between the projecting abutment 240 and the web of the rail may provide added strength and stability to the resulting assembly. For example, such a configuration may provide added strength in association with a cantilever test such as described above. Such a configuration may provide resistance to twisting of the rail 230 in certain situations.

In other embodiments, the rail connecting portion 232 may be configured to be wholly conformal, mimicking the profile of the C-shaped profile of the rail 204. For example, in such an embodiment, the projecting abutment portion may be configured such that in extends into contact with the web and each flange member of the C-shaped rail member 204.

While the invention may be susceptible to various modifications and alternative forms, specific embodiments have been shown by way of example in the drawings and have been described in detail herein. Of course, one or more features of one described embodiment may be utilized in conjunction with one or more features of another described embodiment. It should be understood that the invention is not intended to be limited to the particular forms disclosed. Rather, the invention includes all modifications, equivalents, and alternatives falling within the spirit and scope of the invention as defined by the following appended claims. It is again noted that the braces of the present disclosure may be used on a variety of other types of ladders, including extension ladders, straight ladders and ladders of other configurations.

What is claimed is:

1. A method of assembling a ladder, the method comprising:

providing a first rail;

providing a cross-member;

providing a first brace having a first connecting portion, a second connecting portion, and a strut portion between the first connecting portion and the second connecting portion, the first connecting portion having a tubular configuration, the tubular configuration including an opening having a bottom end;

sliding the first rail through an opening of the tubular configuration such that the first connecting portion surrounds a portion of the first rail and the first rail extends downward from the tubular configuration and below the bottom end of the opening; and coupling the second connecting portion with the first cross-member.

2. The method according to claim 1, wherein coupling the second connecting portion with the first cross-member includes sliding the cross-member through a second opening of a second tubular configuration of the second connecting portion such that the second connecting portion surrounds a portion of the cross-member.

3. The method according to claim 2, further comprising coupling the cross-member with the first rail after sliding the cross-member through the second opening of the second tubular configuration of the second connecting portion.

4. The method according to claim 1, further comprising coupling the cross-member to the first rail.

5. The method according to claim 4, wherein coupling the cross-member to the first rail occurs prior to sliding the first rail through the opening of the tubular configuration.

6. The method according to claim 1, wherein coupling the second connecting portion with the cross-member includes coupling a flange of the first connecting portion with the first cross-member using a mechanical fastener.

7. The method according to claim 1, further comprising:

providing a second rail;

providing a second brace having a first connecting portion, a second connecting portion, and a strut portion between the first connecting portion and the second connecting portion, the first connecting portion having a second tubular configuration;

sliding the second rail through a second opening of the second tubular configuration of the second brace such that the first connecting portion of the second brace surrounds a portion of the second rail; and coupling the second connecting portion of the second brace with the cross-member.

8. The method according to claim 1, further comprising leaving the first rail free to slide within the tubular configuration.

9. The method according to claim 1, further comprising fastening the first connecting portion with the first rail with a mechanical fastener.

10. A method of assembling a ladder, the method comprising:

providing a first rail, a second rail spaced apart from the first rail, and at least one member extending between and coupled to the first rail and the second rail;

providing a first foot coupled to the first rail;

providing a brace having a unitary member including a first connecting portion coupled with the first rail, a second connecting portion coupled with the at least one member, and a strut portion extending between, and connected to, the first connecting portion and the second connecting portion, wherein the first connecting portion includes a tubular configuration;

sliding a portion of the first rail through the tubular configuration to a location between the first foot and the at least one member, wherein the first connecting portion is not fastened to the first rail by a mechanical fastener or an adhesive; and coupling the second connecting portion with the at least one member.

11. The method of claim 10, wherein sliding the portion of the first rail through the tubular configuration includes encircling the first rail with the tubular configuration.

12. The method of claim 10, wherein the second connecting portion is maintained in a sliding relationship with the at least one member.

13. The method of claim 10, wherein the at least one member comprises a ladder rung.

14. The method of claim 10, wherein the at least one member comprises a cross-member.

15. The method of claim 10, further comprising coupling at least one flange of the second connecting portion with the at least one member.

16. The method of claim 10, further comprising fastening the at least one flange with the at least one member using a mechanical fastener.

17. The method of claim 10, wherein the tubular configuration conformally engages the first rail at the location.

18. The method of claim 10, further comprising:

providing a second brace having a unitary member including a first connecting portion coupled with the second rail, a second connecting portion coupled with the at least one member, and a strut portion extending between, and connected to, the first connecting portion of the second brace and the second connecting portion of the second brace, wherein the first connecting portion of the second brace includes a second tubular configuration;

sliding the second rail through a second opening of the second tubular configuration of the second brace such that the first connecting portion of the second brace surrounds a portion of the second rail; and coupling the second connecting portion of the second brace with the at least one member.

19. The method of claim 10, further comprising contacting the first connecting portion to a web member of the first rail.

20. The method of claim 10, wherein coupling the cross-member to the first rail occurs prior to sliding the first rail through an the opening of the tubular configuration.

* * * * *